US012259750B2

(12) United States Patent
Inada et al.

(10) Patent No.: US 12,259,750 B2
(45) Date of Patent: Mar. 25, 2025

(54) DISPLAY DEVICE

(71) Applicant: Innolux Corporation, Miaoli County (TW)

(72) Inventors: Toshiya Inada, Miaoli County (TW); Masahiro Yoshiga, Miaoli County (TW); Yoshitada Ozaki, Miaoli County (TW); Satoru Takahashi, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/661,679

(22) Filed: May 12, 2024

(65) Prior Publication Data

US 2024/0295901 A1    Sep. 5, 2024

Related U.S. Application Data

(63) Continuation of application No. 18/307,003, filed on Apr. 26, 2023, now Pat. No. 12,013,721, which is a continuation of application No. 17/407,164, filed on Aug. 19, 2021, now Pat. No. 11,681,325, which is a continuation of application No. 16/698,954, filed on Nov. 28, 2019, now Pat. No. 11,126,221.

(51) Int. Cl.
  *G09G 5/00*   (2006.01)
  *G06F 1/16*   (2006.01)
  *G09G 3/3275* (2016.01)
  *G09G 3/36*   (2006.01)

(52) U.S. Cl.
  CPC ......... *G06F 1/1607* (2013.01); *G09G 3/3275* (2013.01); *G09G 3/3688* (2013.01)

(58) Field of Classification Search
  CPC ... G09G 3/3275; G09G 3/3688; G06F 1/1607
  See application file for complete search history.

(56) References Cited

U.S. PATENT DOCUMENTS

2017/0263895 A1*  9/2017  Lee ................... H10K 59/35

FOREIGN PATENT DOCUMENTS

| CN | 106252377 | 12/2016 |
| CN | 109192076 | 1/2019 |

OTHER PUBLICATIONS

"Office Action of China Counterpart Application", issued on Sep. 2, 2024, pp. 1-7.

* cited by examiner

*Primary Examiner* — Abbas I Abdulselam
(74) *Attorney, Agent, or Firm* — JCIPRNET

(57) ABSTRACT

A display device includes first color filter, a second color filter, a third color filter, a first transparent region, a second transparent region, a third transparent region and a fourth transparent region. The second color filter has a first edge extending along a first direction and a second edge extending along a second direction. The first color filter is disposed adjacent to the first edge, and the third color filter is disposed adjacent to the second edge. The first color filter, the second color filter and third color filter are surrounding by the first transparent region, the second transparent region, the third transparent region and the fourth transparent region. Areas of the first transparent region, the second transparent region, the third transparent region and the fourth transparent region are greater than areas of the first color filter, the second color filter and the third color filter.

7 Claims, 16 Drawing Sheets

DISPLAY DEVICE

CROSS-REFERENCE TO RELATED APPLICATION

This application is a continuation application of and claims the priority benefit of a prior application Ser. No. 18/307,003, filed on Apr. 26, 2023. The prior application Ser. No. 18/307,003 is a continuation application of and claims the priority benefit of a prior application Ser. No. 17/407,164, filed on Aug. 19, 2021. The prior application Ser. No. 17/407,164 is a continuation application of and claims the priority benefit of a prior application Ser. No. 16/698,954, filed on Nov. 28, 2019. The entirety of each of the above-mentioned patent applications is hereby incorporated by reference herein and made a part of this specification.

BACKGROUND

1. Field of the Disclosure

The disclosure is related to display device, and particularly related to transparent display device.

2. Description of Related Art

In operation of the transparent display device, an image may be normally displayed to a user by the transparent display device. However, the transparent display device contains a transparent part and then the ambient background of the transparent display device may still be seen by the user. The transparent display device in design includes a transparent part to allow the light of background to transmit through at the same time, so that the user may see both the image and the background scene at the same time. In this situation, a portion of the background scene behind the transparent display device may not be blocked by the transparent display device.

To control the pixels, the transparent display device still needs data lines and gate lines control the pixels to display the image. The light from background would transmit through the transparent part, which is conventionally implemented in each pixel. When the pixel size is reduced, the light from background may be diffracted by the data lines and gate lines or even the black matrix. As a result, the visual image through the transparent part may get blur caused by diffraction.

Reducing the blur effect of the transparent display device is at least one of the factors to be improved as the development of the transparent display device is continuously proceed.

SUMMARY

The disclosure provides a transparent display device, in which the transparent part is implemented to reduce the diffraction effect.

In an embodiment, the disclosure provides a display device including a first color filter, a second color filter, a third color filter, a first transparent region, a second transparent region, a third transparent region and a fourth transparent region. The second color filter has a first edge extending along a first direction and a second edge extending along a second direction different from the first direction. The first color filter is disposed adjacent to the first edge, and the third color filter is disposed adjacent to the second edge. The first color filter, the second color filter and third color filter are surrounding by the first transparent region, the second transparent region, the third transparent region and the fourth transparent region. Areas of the first transparent region, the second transparent region, the third transparent region and the fourth transparent region are greater than areas of the first color filter, the second color filter and the third color filter.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

The disclosure is related to a transparent display device, in which the transparent region is provided to at least reducing the visual effect caused by diffraction from non-transparent parts in the pixel array, such data lines or gate lines, or even the black matrix.

Several embodiments are provided as the disclosure, but the disclosure is not just limited to the embodiments. In addition, the disclosure also allows a suitable combination between the embodiments as provided. In addition, the expressions "an element overlying another element", "an element is disposed above another element", "an element is disposed on another element" and "an element is disposed over another element" may indicate that the element is in direct contact with the other element, or that the element is not in direct contact with the other element, there being one or more intermediate elements disposed between the element and the other element.

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

Figure 1:
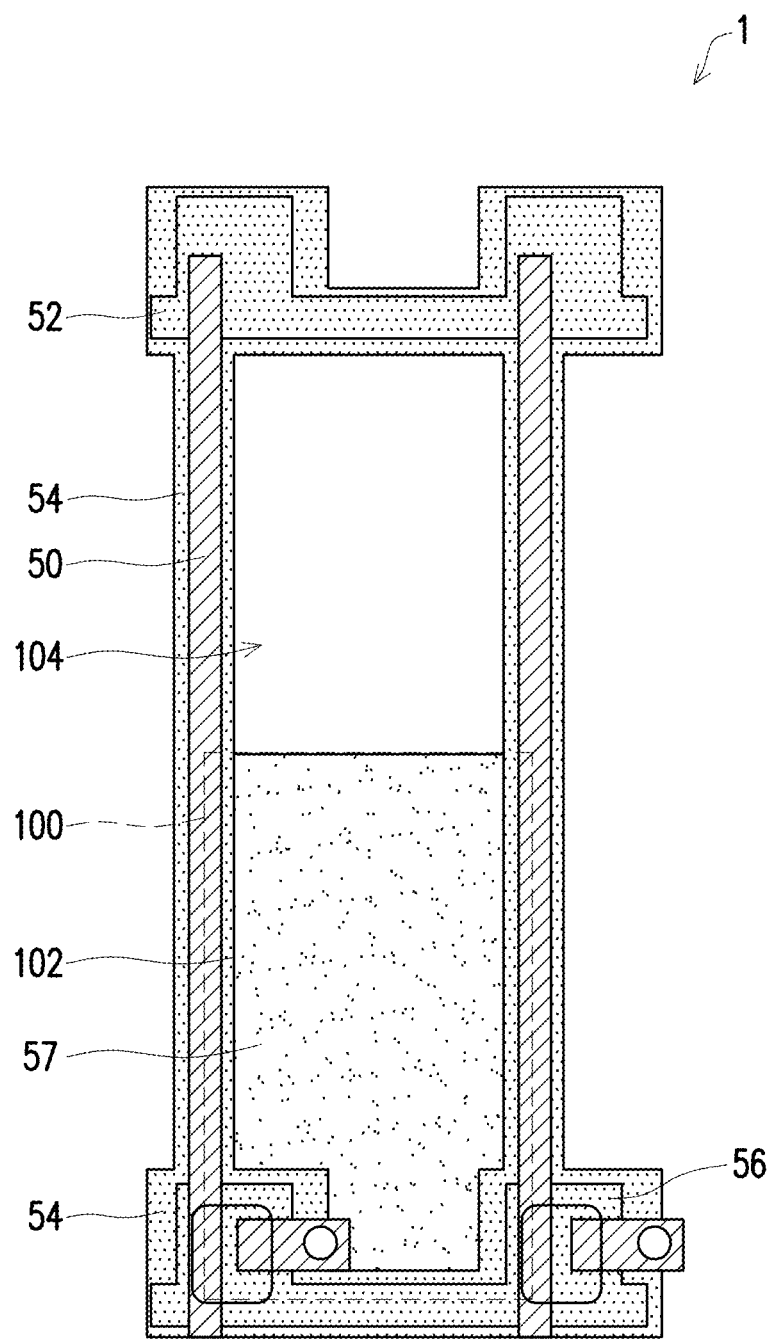
FIG. 1 is a drawing, schematically illustrating a basic pixel structure of a transparent display device.

FIG. 1 is a drawing, schematically illustrating a basic pixel structure of a transparent display device. The disclosure has firstly looked into the basic pixel structure of a transparent display device. Referring to FIG. 1, a basic pixel structure of a transparent display device in an example may include a pixel region 100 and a transparent region 104. A pixel region 100 may include a sub-pixel comprising a data line 50 and a gate line 52, a transistor 56, a color filter 57 and a pixel electrode 102. In some embodiment, the pixel region can comprise at least three sub pixels. In addition, the transparent device further comprises a black matrix 54 may dispose over the data line 50, the gate line 52, or transistor 56. Generally as an example, the data line 50 and the gate line 52 may define a region, including a pixel region 100 and a transparent region 104. In some embodiment, the transparent region is defined by the data line 50, gate line and black matrix 54 without the pixel region 100. Generally, a transparent display device may further include a backlight source. The backlight source may be light-emitting diode (LED) in an example. In some embodiments, the light-emitting diode in an example may include organic light-emitting diode (OLED), quantum dot light-emitting diode (QLED), mini light-emitting diode (mini LED) or micro light-emitting diodes (micro LED), but not just limited thereto. The transparent display device may include a plurality of the basic pixel structures 1, in which the color filters 57 in the basic pixel structures 1 may be red, green or blue. In further embodiments, the color filters 57 may be same color. However, the disclosure is not just limited to the embodiments.

The transparent region 104 in the transparent display device allows the light from background to pass through. As a result, a user may see both the image as displayed and a portion of the background behind the transparent display device.

The structure of the transparent region 104 would determine the quality of the background scene as seen. The issue about the transparent region 104 should be looked into. Then, the blur effect of the background scene may be reduced by modifying the configuration of the transparent region.

In considering the performance of the transparent display device, a diffraction effect in viewing the background needs to be concerned. The diffraction effect may be large in conventional structure, causing non-negligible blur effect.

Figure 2:
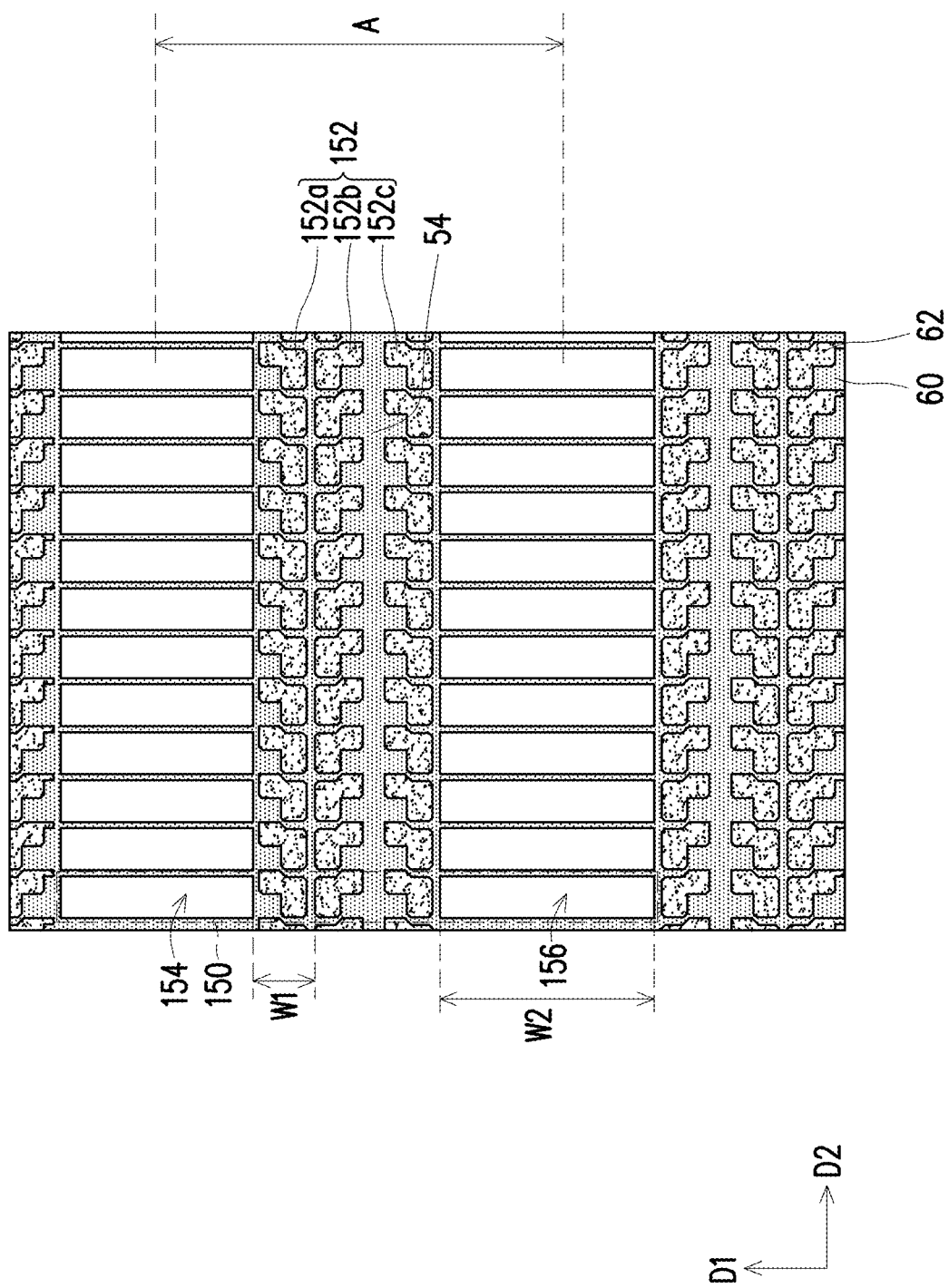
FIG. 2 is a drawing, schematically illustrating the transparent region in a pixel array of a transparent display device, according to an embodiment of the disclosure.
Figure 5:
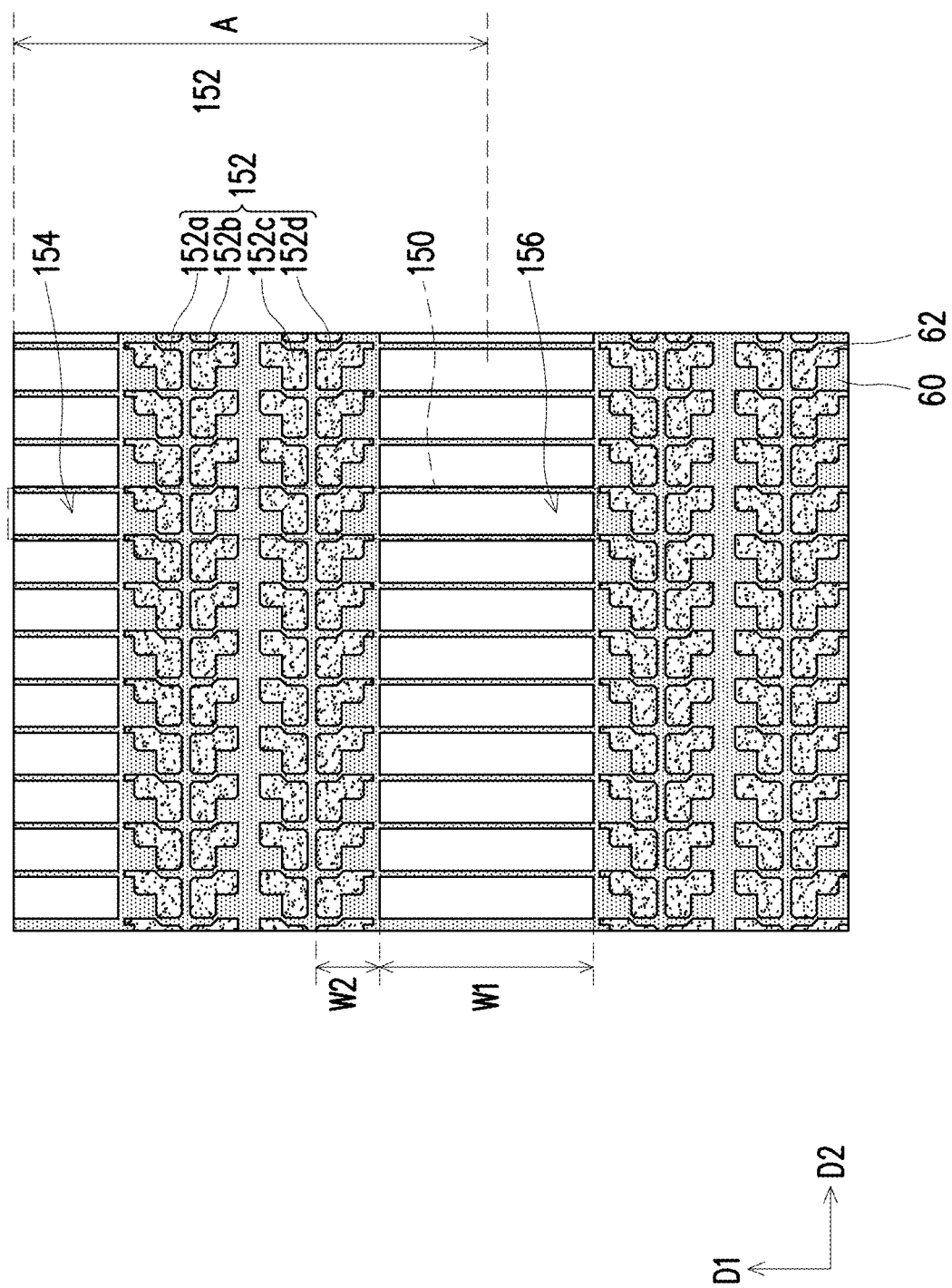
FIG. 5 is a drawing, schematically illustrating the transparent region in a pixel array of a transparent display device, according to an embodiment of the disclosure.

FIG. 2 is a drawing, schematically illustrating the transparent region in a pixel array of a transparent display device, according to an embodiment of the disclosure. Referring to FIG. 2, as to the region 150, the pixel region 152 with the two transparent regions 154, 156 are arranged along the direction D1, as indicated by dashed line. The pixel region 152 may include three sub-pixels 152a, 152b, 152c, which is disposed between the transparent region 154 and another transparent region 156. The drawing in FIG. 2 is a top view of the color filter substrate in which a structure part 60, may include thin film transistor and other actual elements disposed on the TFT substrate, but is not shown in the present schematic diagram. As also noted, the thin film transistor and the color filter 62 may be at the same side or different side of the device substrate. A region 150 in an embodiment referring to the pixel region 152 and the two transparent regions 154, 156, as indicated by dashed line, is taken for description. A pitch A between the transparent region 154 and the transparent region 156 in an embodiment may be a minimum distance from a center point of the transparent region 154 to a center point of the transparent region 156 along the direction D1. In an embodiment, the sub-pixel 152a, 152b, 152c may have a first width w1 along the direction D1. The transparent region 154 and the transparent region 156 may have the second width w2 along the direction D1. FIG. 5 would further describe the first width w1 and the second width w2. Alternatively, a pitch A between the transparent region 154 and the transparent region 156 in an embodiment may be a distance from a reference point at an edge such as the upper edge of the transparent region 154 to a same reference point at an edge such as the upper edge of the transparent region 156 along the direction D1. The pitch A between the transparent region 154 and the transparent region 156 is increased in the disclosure. The black matrix 54 may cover the data line, the gate line, and the thin film transistor. However, in some embodiment, the implementation of black matrix 54 may partially cover over a portion of the device elements of gate line, data line, driving transistor, pixel electrode, and so on without specific limitation.

The black matrix 54 may selectively arrange or not arrange according to the requirement. The disclosure may increase the pitch A between the adjacent two transparent regions 154 and 156 to reduce the interference and improve display quality. In addition, the disclosure is not limited to the implementation of the black matrix 54 as described.

The forgoing disclosure of embodiments is based on the drawing as an example. However, the disclosures in the other embodiments and drawings with the features described above may also fall into the protection scope of the forgoing disclosure.

Figure 3:
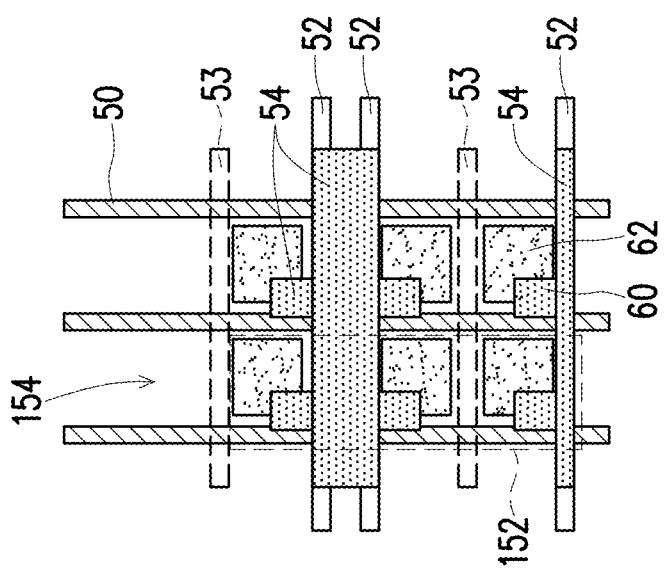
FIG. 3 is a drawing, schematically illustrating the pixel structure corresponding to the pixel array in FIG. 2, according to an embodiment of the disclosure.

FIG. 3 is a drawing, schematically illustrating the pixel structure corresponding to the pixel array in FIG. 2, according to an embodiment of the disclosure. Referring to FIG. 3, just a portion of the black matrix 54 is shown to optionally cover the device element, such as the gate lines 52. In an embodiment, two adjacent gate lines 52 are covered by the thicker black matrix 54. Likewise, the data line 50 may also be covered by another portion of the black matrix 54. In addition, the region 53 between the two color filters 62 or between the transparent region 154 and the color filter 62 may be or may not be implemented with the black matrix. In other words, the black matrix 54 may be selectively formed at the location according to the requirement without specific limitation. In an embodiment, two adjacent data lines 50, a gate line 52 and a black matrix may define a region as a pixel region 152. In addition, the transparent region 154 in an embodiment may be defined by two adjacent data line 50, the region 53, at which the black matrix 54 may or may not be implemented, and a gate line (not shown in the FIG. 3). On the other hand, the black matrix describe in this embodiment is used to describe the corresponding position to the TFT side substrate. The black matrix 54 could be disposed on the color filter substrate or TFT substrate, but not limited thereto. The above-mentioned description of the black matrix 54 may also be applied to other embodiments under the similar schematic diagrams, which will not be redundantly repeated.

Figure 4:
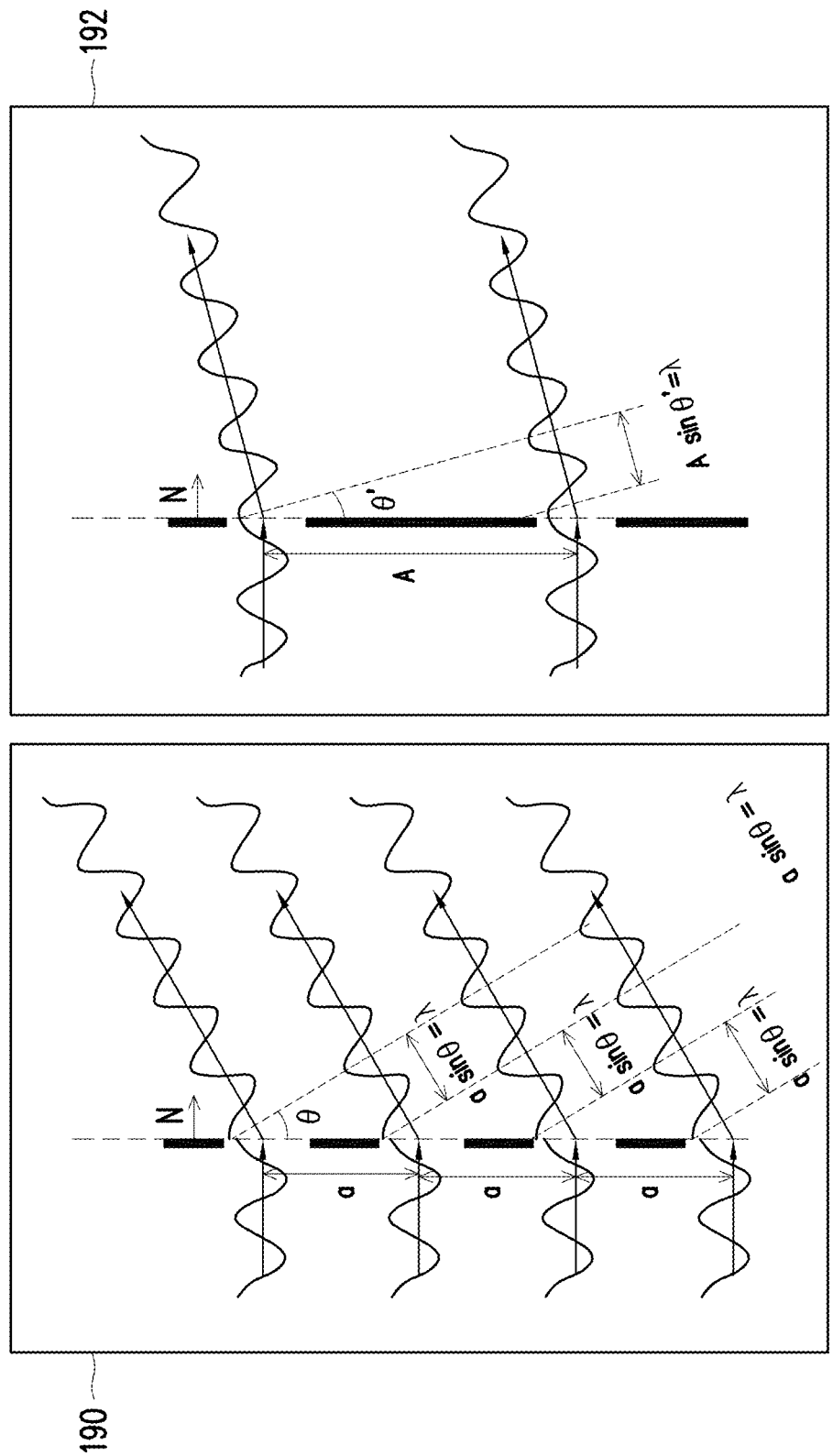
FIG. 4 is a drawing, schematically illustrating a diffraction effect, according to an embodiment of the disclosure.

To see the diffraction effect is reduced by increasing the pitch of transparent region, the theoretic base is provided. FIG. 4 is a drawing, schematically illustrating a diffraction effect, according to an embodiment of the disclosure. Referring to FIG. 4, the diffraction mechanism are shown, corresponding to a smaller pitch "a" and a larger pitch "A" between two transparent regions. The diffraction effect 190 with pitch "a" should satisfy a diffraction condition in optical theory:

$$a \cdot \sin\theta = \lambda,$$

where $\theta$ is the diffraction angle and $\lambda$ is the wavelength. The diffraction effect 192 with larger pitch "A" in optical theory for the right part in FIG. 4 is $$A \cdot \sin\theta' = \lambda.$$

To the given wavelength $\lambda$, the pitch "A" is larger than the pitch a, then the diffraction angle $\theta'$ for the pitch "A" is reduced. This implies that the diffraction angle $\theta'$ for the $1^{st}$ order diffraction pattern, causing blur effect, is more approaching to 0 degree, which is referring to the normal direction N. The blur effect causing by diffraction may be reduced.

The disclosure may increase the pitch, such as the larger pitch "A", between the adjacent two transparent regions 154, 156.

FIG. 5 is a drawing, schematically illustrating the transparent region in a pixel array of a transparent display device, according to an embodiment of the disclosure. Referring to FIG. 5, a further application in an embodiment that four sub-pixels 152a, 152b, 152c, 152d are arranged along the direction D1. In an embodiment, the four sub-pixels 152a, 152b, 152c, 152d arranged along the direction D1 may form as a pixel region 152.

As to sizes or the width along the direction D1, the transparent regions 154 and 156 in sizes or shapes may be same or different. The pitch A between the transparent regions 154 and 156 is increased when four sub-pixels 152a, 152b, 152c, 152d are arranged together in an embodiment. However, the black matrix can be selectively arranged according to the actual design, without limited to the specific configuration. The disclosure is not limited to the embodiments.

As to configuration in the embodiments, one of the transparent regions 154, 156 has a first width w1 in maximum along the direction D1 and one of the at least three sub-pixels 152a, 152b . . . has a second width w2 in maximum along the direction D1. The first width w1 is different from the second width w2. The second width w2 in an embodiment may refer to the width of one sub-pixel 152a, 152b. However, the second width w2 in an embodiment may refer to a width by averaging a distance between two adjacent sides of the adjacent two transparent regions 154, 156 along the direction D1 by the number of the sub-pixels 152a, 152b . . . disposed in this distance along the direction D1.

In an embodiment, as to the transparent display device, a ratio of the first width w1 to the second width w2 is greater than or equal to 0.01 and less than 1. In another embodiment, a ratio of the first width w1 to the second width w2 is greater than 1 and less than or equal to 200, but the disclosure is limited to this ratio.

In an embodiment, as to the transparent display device, the transparent region 154 and the transparent region 156 are same size or the transparent region 156 is longer than the transparent region 154 along the direction D1.

In an embodiment, as to the transparent display device, the pixel region 152 includes at least three sub-pixels, such as three sub-pixels 152a, 152b, 152c in FIG. 2 or four sub-pixels 152a, 152b, 152c, 152d in FIG. 5, or even more, without specific limitation. In some embodiment, it further comprises another transparent region (not shown in the figure) disposed between the any two of the at least three sub-pixels along the direction (D1).

In an embodiment, as to the transparent display device, the transparent regions 154, 156 are a permanent transparent region or a transparent region under switching control. The permanent transparent region in an embodiment may be transparent material. However, some materials may have the non-transparent state but can be switched to transparent state under control by apply a bias. In other words, the disclosure may form the transparent region according to the actual design. In some embodiment, the transparent region may include or does not include the pixel electrode. If the pixel electrode is included in the transparent region, it can be applied with an operation voltage to be normally white, which is at the transparent state.

Figure 6:
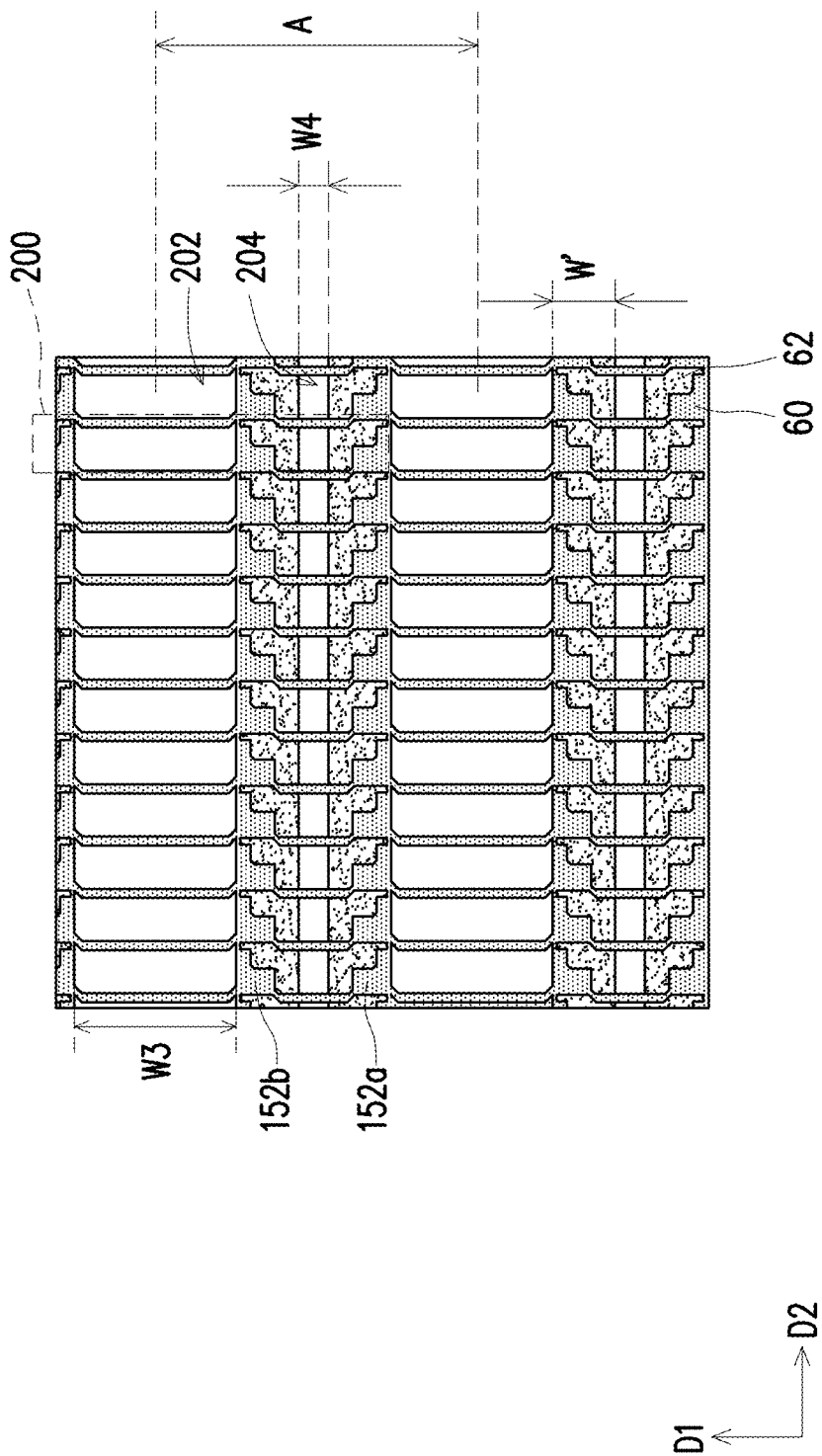
FIG. 6 is a drawing, schematically illustrating the transparent region with another transparent region in a pixel array of a transparent display device, according to an embodiment of the disclosure.

In an embodiment, as to the transparent display device, it may further comprise another transparent region disposed between the sub-pixels in the at least two sub-pixels. FIG. 6 is a drawing, schematically illustrating the transparent region with another transparent region in a pixel array of a transparent display device, according to an embodiment of the disclosure.

The forgoing disclosure of embodiments is based on the drawing as an example. However, the disclosures in the other embodiments and drawings with the features described above may also fall into the protection scope of the forgoing disclosure.

Referring to FIG. 6, in an embodiment, the transparent display device in an embodiment may include a unit region 200. The unit region 200 includes a first transparent region 202 and at least two sub-pixels 152a, 152b arranged along the direction D1 adjacent to the first transparent region 202. The unit region 200 may optionally further comprise a second transparent region 204 disposed between the at least two sub-pixels 152a, 152b. Thus, in an embodiment of FIG. 6, the unit region 200 sequentially comprises a sub-pixel 152a, a second transparent region 204, a sub-pixel 152b and a first transparent region 202 along the direction D1. The first transparent region 202 has a third width w3 in maximum along the direction D1. The second transparent region 204 has a fourth width w4 in minimum along the direction D1. The fourth width w4 of the second transparent region 204 is smaller than the third width w3 of the first transparent region 202. In an embodiment, a ratio R of the fourth width w4 of the second transparent region 204 to the third width w3 of the first transparent region 202 is in a range of 0<R≤0.5. In an embodiment, the unit region may refer to a minimum unit, which is repeated in the pixel array. In an embodiment, the at least two sub-pixels 152a, 152b has a width w' in a maximum along the direction D1. A ratio of the third width w3 to the width w' is greater than or equal to 0.01 and less than 1. In another embodiment, a ratio of the third width w3 to the width w' is greater than 1 and less than or equal to 200, but the disclosure is limited to this ratio. The width w' in an embodiment may refer to a distance between two adjacent sides of the first transparent region 202 and the second transparent region 204 along the direction D1.

In an embodiment, the direction D1 is substantially parallel to the extending direction of data line. In another embodiment, the direction D1 is crossed to the extending direction of the gate line. Herein, the direction D1 and the extending direction of the gate line are different. For example, the direction D1 may be perpendicular to the extending direction of the gate line or an angle (such as 75-90 degrees or 80-90 degrees) is included between the direction D1 and the extending direction of the gate line, but not just limited thereto.

The diffraction effect from the second transparent region 204 with narrow width may provide the additional diffraction effect, which may reduce the interference between two larger first transparent regions 202. As a result, the intensity of the diffraction pattern may be reduced to further reduce the blur effect. In addition, the pitch A described as the embodiment of the FIG. 2 between two adjacent first transparent region 202 arranged along the direction D1 may increase. The diffraction effect is reduced by increasing the pitch A of transparent region.

Figure 7:
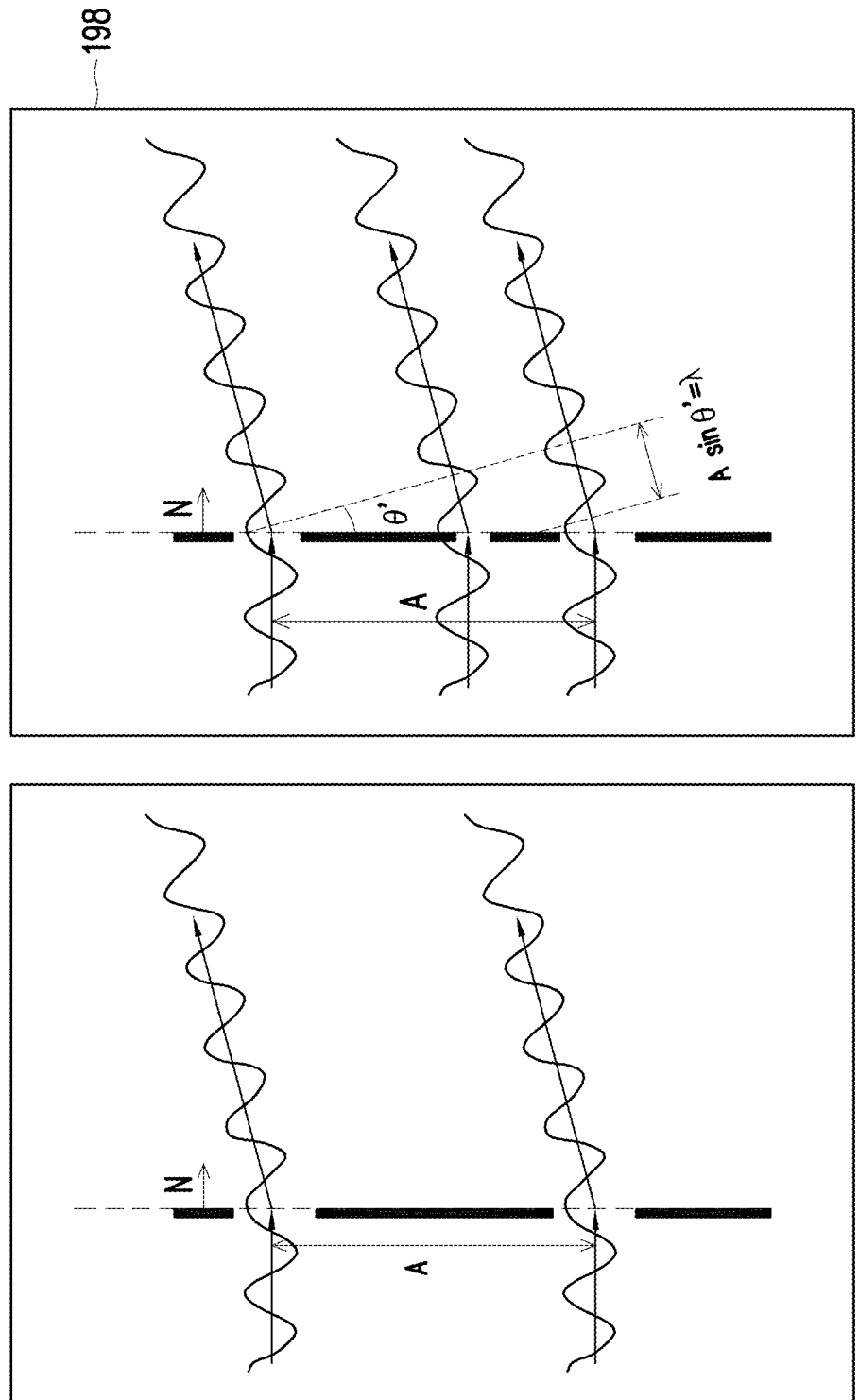
FIG. 7 is a drawing, schematically illustrating a diffraction effect, according to an embodiment of the disclosure.

FIG. 7 is a drawing, schematically illustrating a diffraction effect, according to an embodiment of the disclosure. Referring to FIG. 7, the diffraction effect 194 form the first transparent regions 202 is shown. The diffraction effect 198 form the first transparent regions 202 with the second transparent region 204 is also shown. In optical behaviour, the beam passing the second transparent region 204 in narrow width may produce additional wave bottom in intensity to cause a subtraction effect to the wave peak. Thus, the blur effect in the diffraction effect 198 may be reduced in which the arrangement of the first transparent region 202 and the second transparent region 204 is shown, for example, in FIG. 6.

The forgoing disclosure of embodiments is based on the drawing as an example. However, the disclosures in the other embodiments and drawings with the features described above may also fall into the protection scope of the forgoing disclosure.

Figure 8:
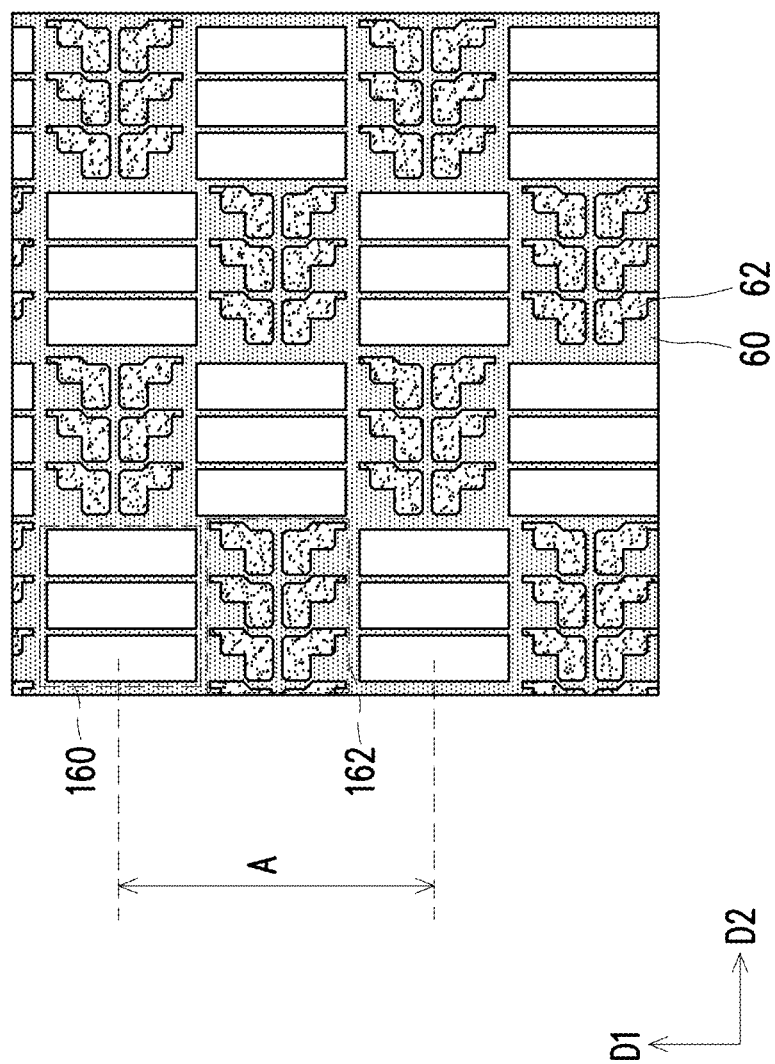
FIG. 8 is a drawing, schematically illustrating the first region and the pixel region are arranged alternately along the direction D1 and the direction D2 in a pixel array of a transparent display device, according to an embodiment of the disclosure.

FIG. 8 is a drawing, schematically illustrating the first region and the pixel region are arranged alternately along the direction D1 and the direction D2 in a pixel array of a transparent display device, according to an embodiment of the disclosure.

Referring to FIG. 8, another configuration on the transparent region and the pixel region in an embodiment is further provided. A transparent display device includes at least two first regions 160 and at least two pixel regions 162. Each of the at least two first regions 160 includes at least three transparent regions, such as three transparent regions in an embodiment. Each of the at least two pixel regions 162 includes at least three sub-pixels such as three sub-pixels in an embodiment. The at least two first regions 160 and the at least two pixel regions 162 are arranged alternately along the direction D1 and the direction D2. The direction D1 is different from the direction D2. In an embodiment, the first regions 160 and the pixel regions 162 along the direction D1 and the second direction D2 are alternately and adjacently disposed. The first regions 160 along the direction D1 and the second direction D2 are not adjacently disposed. In an embodiment, a pixel region 162 is disposed between adjacent two first regions 160 along the direction D1 and the second direction D2. Likewise, a first region 160 is disposed between adjacent two pixel regions 162 along the direction D1 and the second direction D2.

In some embodiment, the width of the first regions 160 and the width of the pixel regions 162 along the direction D1 are equal. The width of the regions 160 and the width of the pixel regions 162 along the direction D2 are equal. The pixel region 162 in an embodiment forms a full pixel. The pixel region 162 may include other sub-pixel in other compensating color depending on the actual design. In another embodiment, the at least two pixel regions 162 comprises six sub-pixels, but not just limited thereto. In some embodiment, transparent display device further comprises another transparent region (not shown in FIG. 8) which is disposed between two of the at least three sub pixels along the direction D1. The arrangement can refer to the FIG. 9 and the FIG. 9 would further describe in the following. In addition, the pitch A described as the embodiment of the FIG. 2 between two adjacent transparent regions arranged along the direction D1 may increase. The diffraction effect is reduced by increasing the pitch A of transparent region.

The forgoing disclosure of embodiments is based on the drawing as an example. However, the disclosures in the other embodiments and drawings with the features described above may also fall into the protection scope of the forgoing disclosure.

Figure 9:
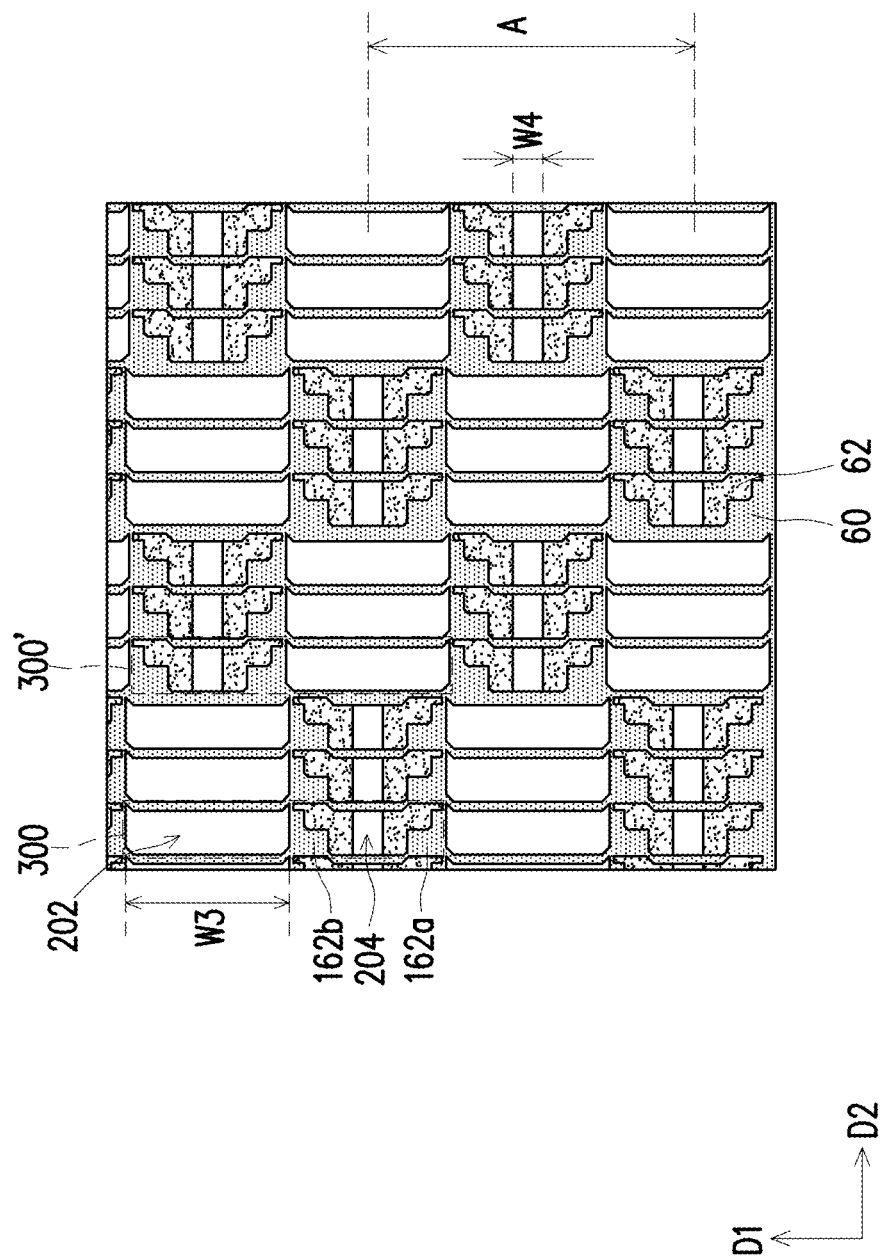
FIG. 9 is a drawing, schematically illustrating the transparent region with another transparent region in a pixel array of a transparent display device, according to an embodiment of the disclosure.

FIG. 9 is a drawing, schematically illustrating with another transparent region in a pixel array of a transparent display device, according to an embodiment of the disclosure. Referring to FIG. 9, as a modification from the structure in FIG. 6, in this embodiment of the disclosure may also include a unit region 300 which sequentially include a sub-pixel 162a, a second transparent region 204, a sub-pixel 162b and a first transparent region 202 along the direction D1. Another unit region 300' may also sequentially with reverse direction to the unit region 300 include a sub-pixel 162a, a second transparent region 204, a sub-pixel 162b and a first transparent region 202. In an embodiment, the unit region 300 and the unit region 300' may be repeated by three to respectively form the first region 160 and the pixel region 162, but not limited to. The embodiment in description is taking an example by using three unit regions 300 and the unit regions 300' to form the arrangement as FIG. 9. In addition, the pitch A described as the embodiment of the FIG. 2 between two adjacent first transparent regions 202 arranged along the direction D1 may increase. The diffraction effect is reduced by increasing the pitch A of transparent region.

The forgoing disclosure of embodiments is based on the drawing as an example. However, the disclosures in the other embodiments and drawings with the features described above may also fall into the protection scope of the forgoing disclosure.

Figure 10:
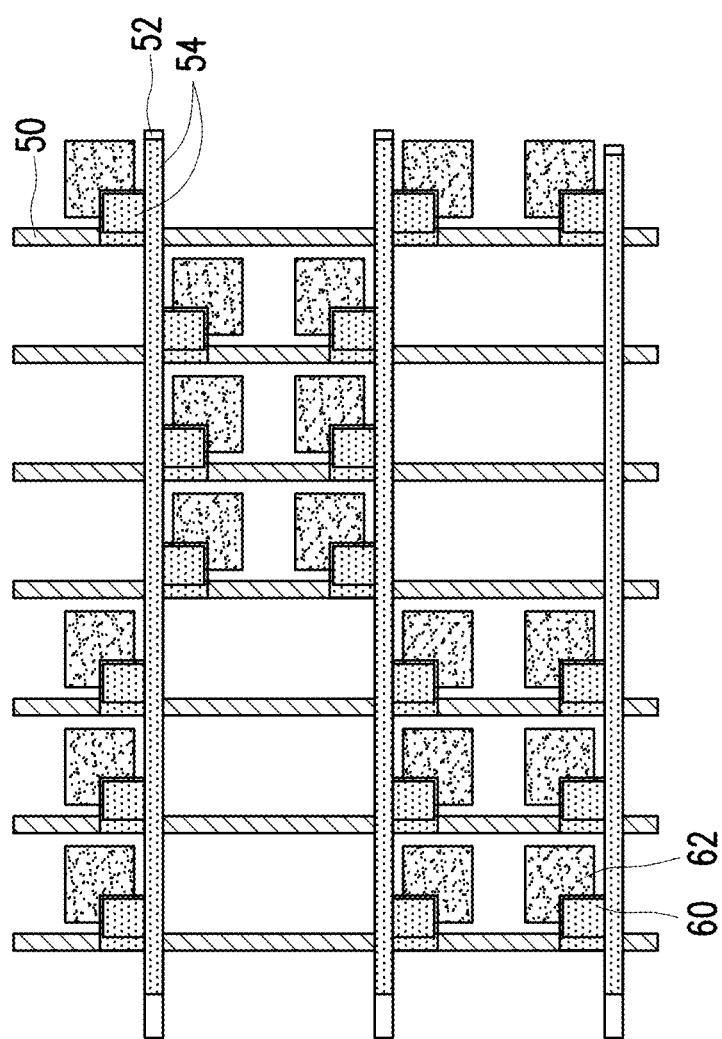
FIG. 10 is a drawing, schematically illustrating the pixel structure corresponding to the pixel array in FIG. 9, according to an embodiment of the disclosure.

FIG. 10 is a drawing, schematically illustrating the pixel structure corresponding to the pixel array in FIG. 9, according to an embodiment of the disclosure. In fabrication, the pixel structure, taking the configuration in FIG. 9 as an example, is shown with the data lines 50 and the gate line 52. In an embodiment, the black matrix 54 may be additionally formed over the gate line 52, thin film transistor and the data line 50 but not limit the disclosure.

In an embodiment, just a portion of the black matrix 54 is shown to optionally cover the gate lines 52. To the pixel structure as fabricated, the data line 50 is also included. Likewise, the data line 50 may also be covered by another portion of the black matrix 54. In other words, the black matrix 54 may be optionally formed at any location according to the requirement without specific limitation.

The forgoing disclosure of embodiments is based on the drawing as an example. However, the disclosures in the other embodiments and drawings with the features described above may also fall into the protection scope of the forgoing disclosure.

Figure 11A:
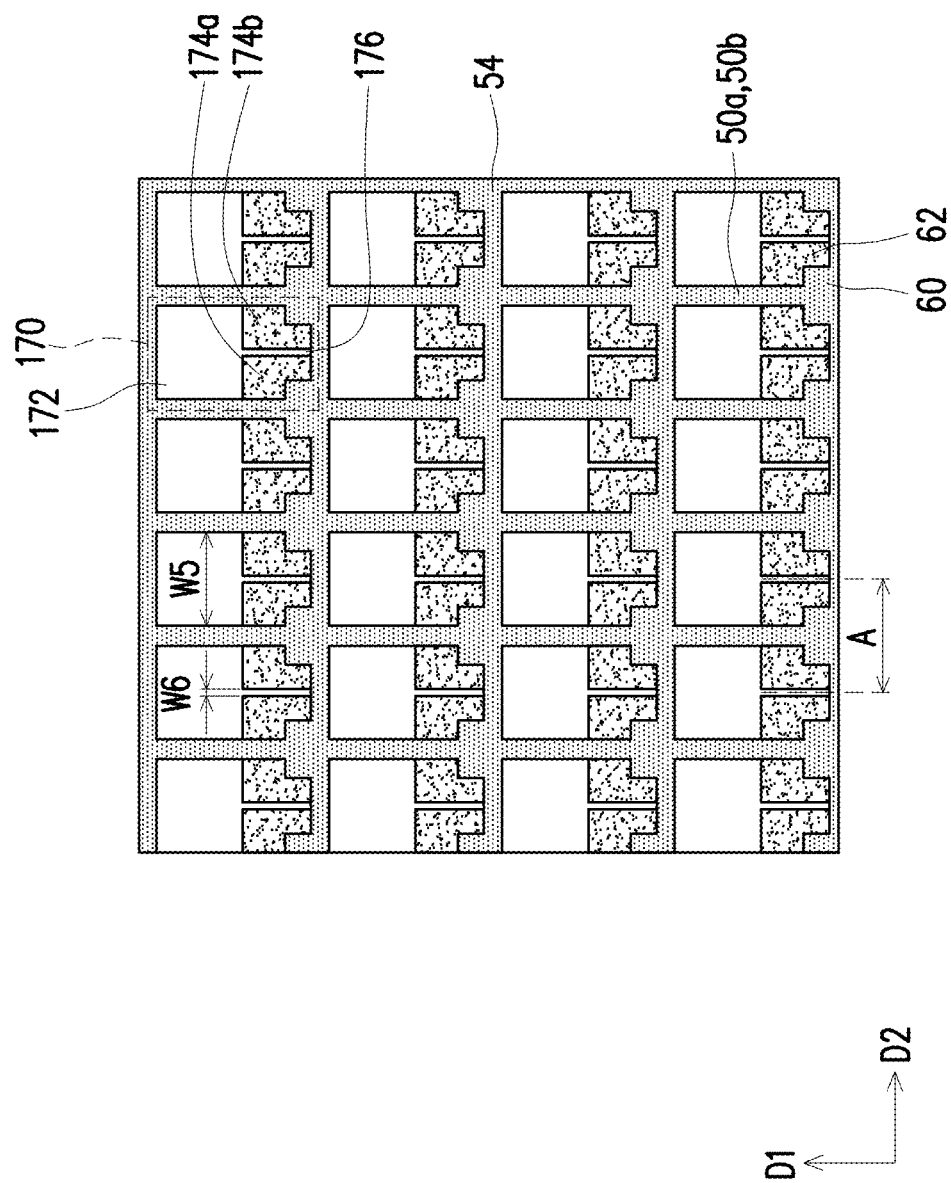
FIG. 11A and FIG. 11B are drawings, schematically illustrating the transparent region with another transparent region in a pixel array of a transparent display device, according to an embodiment of the disclosure.
Figure 11B:
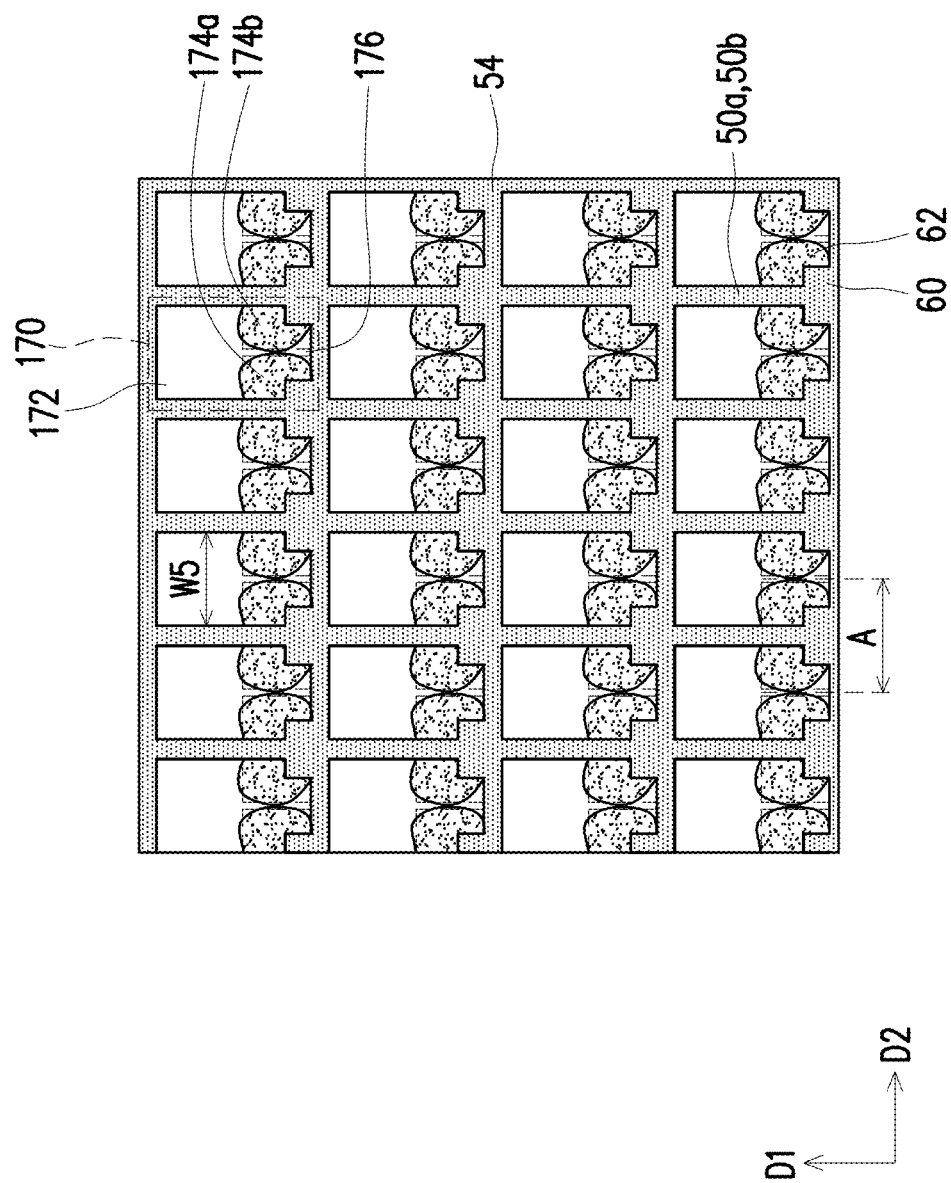

FIG. 11A and FIG. 11B are drawings, schematically illustrating the transparent region with another transparent region in a pixel array of a transparent display device, according to an embodiment of the disclosure. Referring to FIG. 11A, the width of the first transparent region in the direction D2 may be increased by including two sub-pixels along the direction D2. Generally, in an embodiment, a transparent display device includes a unit region 170 including a first transparent region 172, a second transparent region 176, a sub-pixel 174a and a sub-pixel 174b. The sub-pixels 174a and the sub-pixel 174b arranged along the direction D2. In another embodiment, the unit region 170 may further comprises at least two sub-pixels 174a, 174b. The first direction D1 is crossing the direction D2. The first transparent region 172 is adjacent to the sub-pixels 174a and the sub-pixel 174b along the direction D1. The second transparent region 176 is extending along the direction D1 between the two sub-pixels 174a, 174b. The first transparent region 172 has a fifth width w5 in maximum along the direction D2, the second transparent region 176 has a sixth width w6 in minimum along the direction D2, and the fifth width w5 is greater than the sixth width w6. In an embodiment, the direction D2 is substantially parallel to the extending direction of gate line. In another embodiment, the direction D2 is crossed to the extending direction of the data line. Herein, the direction D2 and the extending direction of the data line are different. For example, the direction D2 may be perpendicular to the extending direction of the data line or an angle (such as 75-90 degrees or 80-90 degrees) is included between the direction D2 and the extending direction of the data line, but not just limited thereto.

In this configuration, the pitch A described as the embodiment of the FIG. 2 between adjacent two first transparent regions 172 along the direction D2 is increased. The diffraction effect is reduced by increasing the pitch A between adjacent transparent regions.

Referring to FIG. 11B, the structure is similar to the structure in FIG. 11A but a periphery of the color filter with respect to the sub-pixels 174a, 174b in actual fabrication may extend out, not formed by straight sides. The sixth width w6 is then reduced. In a further situation, the color filters of the two sub-pixels 174a, 174b may even contact to each other, in which the sixth width w6 may be approaching or even equal to zero. In this configuration, the pitch A described as the embodiment of the FIG. 2 between adjacent two first transparent regions 172 along the direction D2 is increased.

The forgoing disclosure of embodiments is based on the drawing as an example. However, the disclosures in the other embodiments and drawings with the features described above may also fall into the protection scope of the forgoing disclosure.

Figure 12:
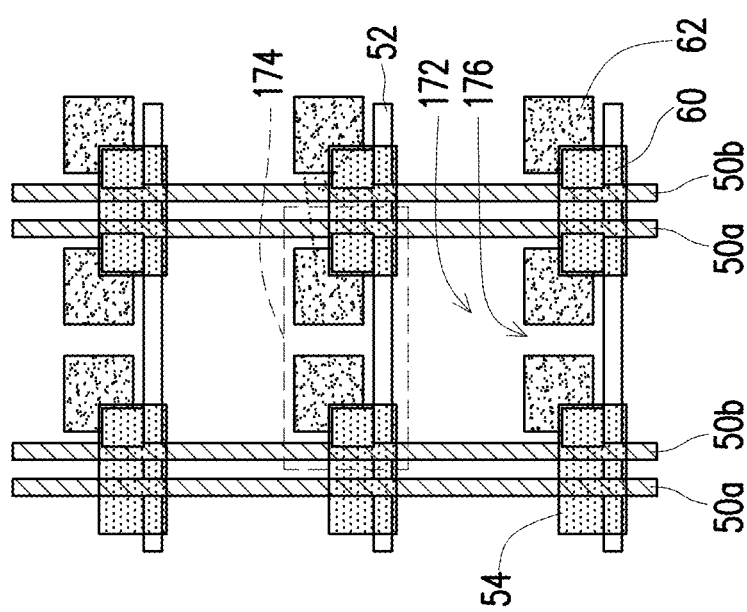
FIG. 12 is a drawing, schematically illustrating the pixel structure corresponding to the pixel array in FIG. 11A and FIG. 11B, according to an embodiment of the disclosure.

FIG. 12 is a drawing, schematically illustrating the pixel structure corresponding to the pixel array in FIG. 11A and FIG. 11B, according to an embodiment of the disclosure. Referring to FIG. 12, in an embodiment, the pixel structure based on the configuration in FIG. 11A and FIG. 11B is involving two adjacent data lines 50a, 50b, which are disposed adjacent to each other but belonging to two unit regions 170 along the direction D2. In other words, the two adjacent data lines 50a, 50b dispose between the adjacent two of the unit region. In this situation, the adjacent two data lines 50a, 50b form a data line group, which occupies a relatively wider data line width, as seen in FIG. 11A and FIG. 11B.

The forgoing disclosure of embodiments is based on the drawing as an example. However, the disclosures in the other embodiments and drawings with the features described above may also fall into the protection scope of the forgoing disclosure.

Figure 13:
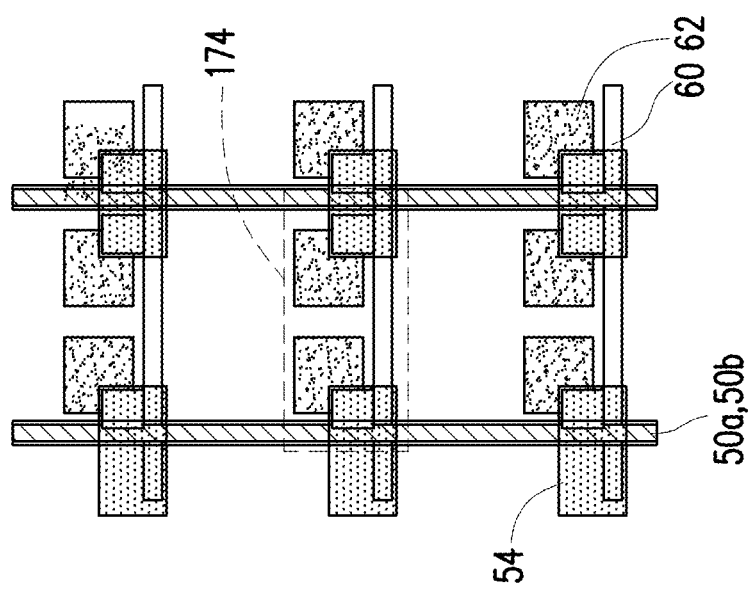
FIG. 13 is a drawing, schematically illustrating the pixel structure corresponding to the pixel array in FIG. 11A and FIG. 11B, according to an embodiment of the disclosure.

In a further modification on FIG. 11A, FIG. 11B and FIG. 12, the adjacent two data lines 50a, 50b in FIG. 12 may be made by different metal layers. In some embodiments, the adjacent two data lines 50a, 50b may have at least an overlapping portion. FIG. 13 is a drawing, schematically illustrating the pixel structure corresponding to the pixel array in FIG. 11A and FIG. 11B, according to an embodiment of the disclosure.

Referring to FIG. 13 with reference to FIG. 11A, FIG. 11B and FIG. 12, the two data lines 50a and 50b in FIG. 12 respectively belonging to the adjacent two unit regions 170 along the direction D2 may be arranged to be overlapped as a data line group. In some embodiment, the two data lines 50a and 50b have at least an overlapped portion, for example, in the top view of FIG. 13. In another embodiment, the two data lines 50a and 50b have a width about equal to a width of a single data line.

The forgoing disclosure of embodiments is based on the drawing as an example. However, the disclosures in the other embodiments and drawings with the features described above may also fall into the protection scope of the forgoing disclosure.

In an embodiment, the pixel structure in other design may include a primary pixel and a second pixel together controlled by two data lines (2D) with one gate line (1G), called 2D1G structure, or controlled by two gate lines (2G) as a master gate line and a slave gate line and one data line (1D), called 2G1D structure. The disclosure may be applied to these applications, in which the gate lines or the two data lines may be stacked up or overlapped, as the examples.

In an embodiment, taking the 2G1D structure for example, two adjacent gate line (not shown), which are disposed adjacent to each other but belonging to two unit regions along the direction D1 (for example, the extending direction of data line). In other words, the two adjacent gate lines dispose between the adjacent two of the unit region.

The forgoing disclosure of embodiments is based on the drawing as an example. However, the disclosures in the other embodiments and drawings with the features described above may also fall into the protection scope of the forgoing disclosure.

Figure 14:
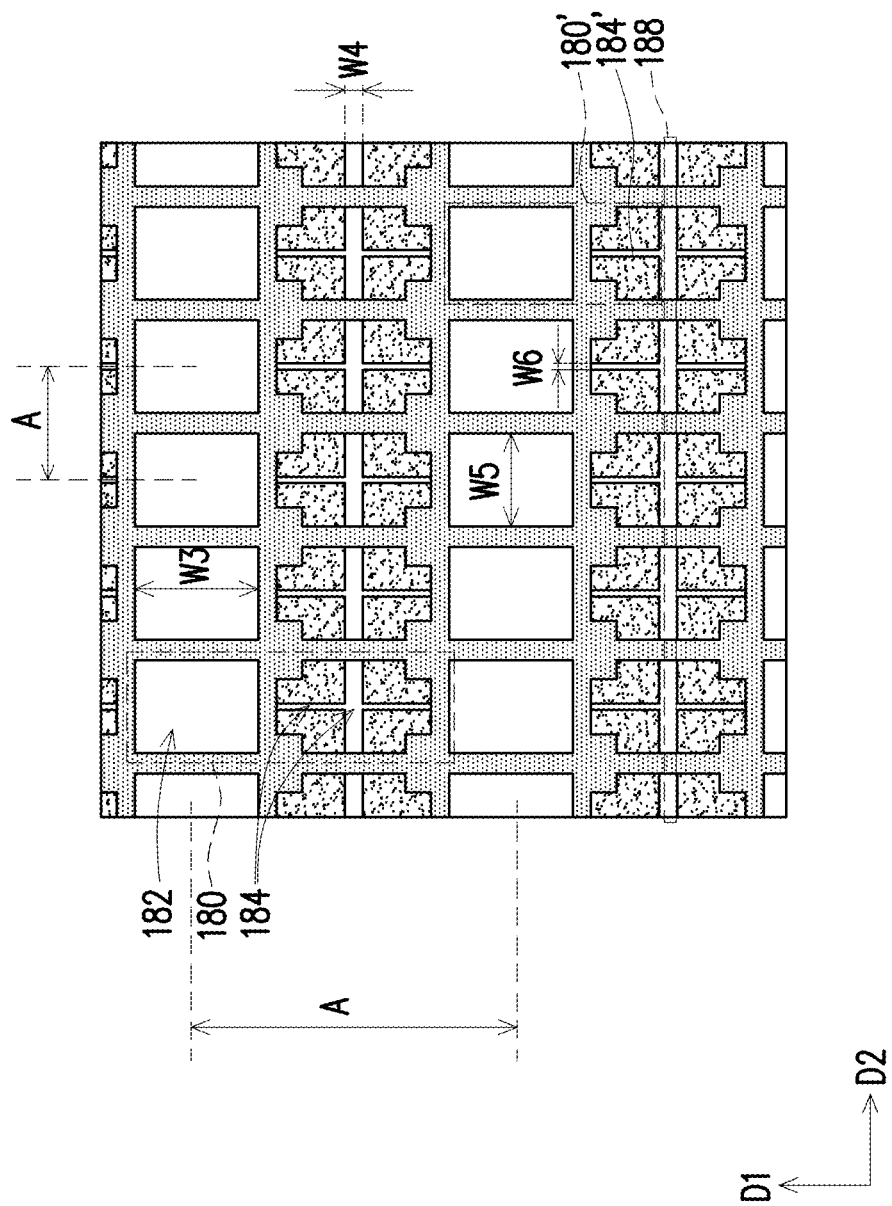
FIG. 14 is a drawing, schematically illustrating the transparent region with another transparent region in a pixel array of a transparent display device, according to an embodiment of the disclosure.

FIG. 14 is a drawing, schematically illustrating the transparent region with another transparent region in a pixel array of a transparent display device, according to an embodiment of the disclosure. Referring to FIG. 14, the configuration for a unit region 180 has included mechanism in FIG. 2 to increase the pitch A of the two of first transparent regions 182 in the direction D1 and the features in FIG. 11A and FIG. 11B to increase the pitch A of the two of first transparent regions 182 in the direction D2. The unit region 180 includes a first transparent region 182, a second transparent region 184 serving as another transparent region and at least two sub-pixels (for example, four sub-pixels), but the disclosure is not limited to four sub-pixels. In this embodiment, referring to the FIG. 14, a portion of the at least two sub-pixels is arranged along the direction D1, and a portion of the at least two sub-pixels is arranged along another direction D2. A portion of the second transparent region 184 is disposed between two of the portion of the at least two sub-pixels arranged along another direction D2. In other words, the second transparent region 184 is among the four sub-pixels shown as FIG. 14. In embodiments, several widths as indicated by w3, w4, w5 and w6 are further described. The width w3 is referring to the width of the first transparent regions 182 along the direction D1. The width w4 is referring to the width of a portion of the second transparent region 184 along the direction D1 and between adjacent two sub-pixels along the direction D1, in which the portion of the second transparent region 184 is extending along the direction D2. The width w4 is smaller the width w3. Further, the width w5 is referring to the width of the first transparent regions 182 along the direction D2. The width w6 is referring to the width of a portion of the second transparent region 184 along the direction D2 and between adjacent two sub-pixels along the direction D2, in which the portion of the second transparent region 184 is extending along the direction D1. The width w6 is smaller the width w5.

The diffraction effect of the first transparent region 182 is relating to the mechanism as described in FIG. 4, in which the pitches of two of the first transparent regions 184 in the direction D1 and the direction D2 are all increased. The diffraction effect of the second transparent region 184 is relating to the mechanism as described in FIG. 7. A black matrix 188 in an embodiment may be additionally implemented between the sub-pixels along the direction D2. However, the use of the black matrix 188 is an option without limiting the disclosure.

The forgoing disclosure of embodiments is based on the drawing as an example. However, the disclosures in the other embodiments and drawings with the features described above may also fall into the protection scope of the forgoing disclosure.

In a further embodiment, a unit region 180' may also be configured, including a first transparent region 182', a second transparent region 184' and two sub-pixels.

Figure 15:
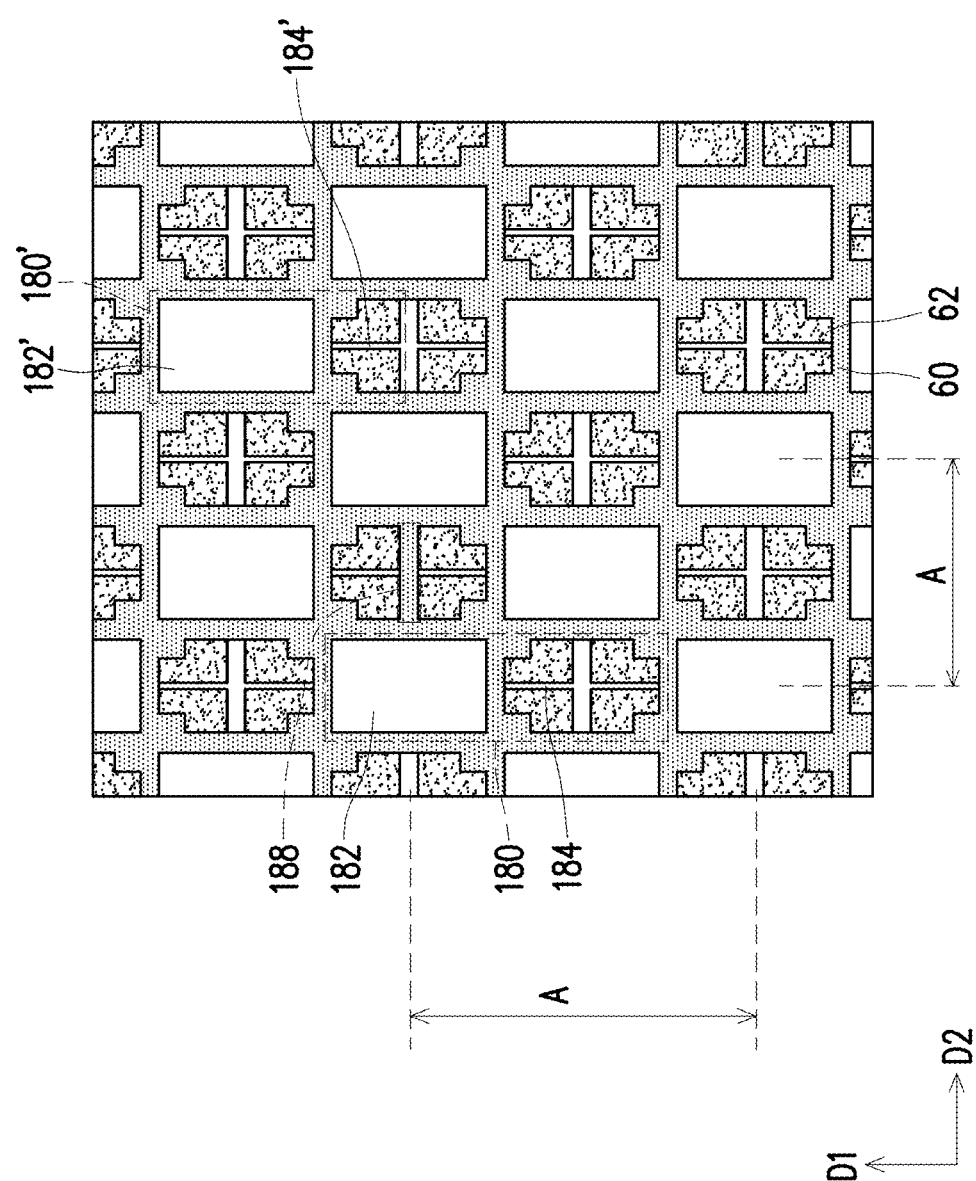
FIG. 15 is a drawing, schematically illustrating the transparent region with another transparent region in a pixel array of a transparent display device, according to a variant embodiment of the FIG. 14 of the disclosure.

FIG. 15 is a drawing, schematically illustrating the transparent region with another transparent region in a pixel array of a transparent display device, according to a variant embodiment of the FIG. 14 of the disclosure. Referring to FIG. 15, the transparent display is configured to also have the unit region 180 and the unit region 180' as described in FIG. 14. The size relations for the widths w3, w4, w4, w5 are not repeatedly described here. However, the first transparent region 182 is alternately disposed with four sub-pixels along the direction D1 and the direction D2.

As also noted, the black matrix 188 in FIG. 14 and FIG. 15 may be optionally implemented to cover the region as intended without specific limitation.

The forgoing disclosure of embodiments is based on the drawing as an example. However, the disclosures in the other embodiments and drawings with the features described above may also fall into the protection scope of the forgoing disclosure.

The disclosure provides the transparent display device based on at least one of the factors including the pitch A of the two of the first transparent regions 182 in direction D1, the pitch A of the two of the first transparent regions 182 in direction D2, the second transparent region 184 in direction D1, the second transparent region 184 in direction D2, and overlapping of the data lines, the diffraction effect of the background scene behind the transparent display device may be reduced.

The pitch described in the disclosure may include a sum of widths of at least two sub-pixels along the sub-pixels arrangement direction.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A display device, comprising:
a first color filter, a second color filter and a third color filter, wherein the second color filter has a first edge extending along a first direction and a second edge extending along a second direction different from the first direction, the first color filter is disposed adjacent to the first edge, and the third color filter is disposed adjacent to the second edge; and
a first transparent region, a second transparent region, a third transparent region and a fourth transparent region, wherein the first color filter, the second color filter and the third color filter are surrounding by the first transparent region, the second transparent region, the third transparent region and the fourth transparent region;
wherein areas of the first transparent region, the second transparent region, the third transparent region and the fourth transparent region are greater than areas of the first color filter, the second color filter and the third color filter.

2. The display device according to claim 1, wherein the first transparent region, the first color filter, the second color filter and the third transparent region are arranged along the second direction.

3. The display device according to claim 1, wherein the second transparent region, the second color filter, the third color filter and the fourth transparent region are arranged along the first direction.

4. The display device according to claim 1, wherein a sum of a width of the first color filter in the second direction and a width of the second color filter in the second direction is smaller than a width of the second transparent region in the second direction.

5. The display device according to claim 1, wherein a sum of a width of the first color filter in the second direction and a width of the second color filter in the second direction is smaller than a width of the fourth transparent region in the second direction.

6. The display device according to claim 1, wherein a sum of a width of the second color filter in the first direction and a width of the third color filter in the first direction is smaller than a width of the first transparent region in the first direction.

7. The display device according to claim 1, wherein a sum of a width of the second color filter in the first direction and a width of the third color filter in the first direction is smaller than a width of the third transparent region in the first direction.

* * * * *